United States Patent
Sato et al.

(10) Patent No.: US 10,378,649 B2
(45) Date of Patent: Aug. 13, 2019

(54) METAL BELLOWS

(71) Applicant: EAGLE INDUSTRY CO., LTD., Minato-ku, Tokyo (JP)

(72) Inventors: Koji Sato, Tokyo (JP); Kuniaki Miyake, Tokyo (JP); Tatsuhiro Arikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 54 days.

(21) Appl. No.: 15/517,496

(22) PCT Filed: Oct. 28, 2015

(86) PCT No.: PCT/JP2015/080326
§ 371 (c)(1),
(2) Date: Apr. 6, 2017

(87) PCT Pub. No.: WO2016/072323
PCT Pub. Date: May 12, 2016

(65) Prior Publication Data
US 2017/0307083 A1    Oct. 26, 2017

(30) Foreign Application Priority Data

Nov. 5, 2014  (JP) ................................ 2014-224804

(51) Int. Cl.
*F16J 3/04*  (2006.01)
*F16J 15/52*  (2006.01)

(52) U.S. Cl.
CPC ................ *F16J 3/047* (2013.01); *F16J 3/04* (2013.01); *F16J 15/52* (2013.01)

(58) Field of Classification Search
CPC ...... F16J 3/047; F16J 3/04; F16J 15/52; F16J 3/00

(Continued)

(56) References Cited

U.S. PATENT DOCUMENTS

| 6,564,606 B2 * | 5/2003 | Okada .................... B21D 15/10 29/454 |
| 2004/0055656 A1 * | 3/2004 | Kurokawa ............ B60T 13/148 138/30 |
| 2005/0098244 A1 * | 5/2005 | Okada ...................... C21D 7/06 148/592 |

FOREIGN PATENT DOCUMENTS

| JP | H02195001 A | 8/1990 |
| JP | H07174233 A | 7/1995 |

(Continued)

OTHER PUBLICATIONS

International Search Report (ISR) dated Jan. 26, 2016, issued for International application No. PCT/JP2015/080326.

*Primary Examiner* — Nathan Cumar

(74) *Attorney, Agent, or Firm* — Law Office of Katsuhiro Arai

(57) ABSTRACT

An impact on the tips of peaks of a metal bellows on contact is reduced, and deformation of the tips of the peaks even on contact is reduced to a minimum. In a free length state of a metal bellows 10 in an early stage of incorporation without extension and contraction, valleys each turn around in a U shape in cross section, peaks each turn around in an arc shape in cross section, the peaks are each provided in a position offset with respect to the center of a pitch between valleys adjacent to the peaks on both sides, and of bellies connected to the peaks on both sides, at least bellies located on the offset side are provided with a constriction protruding inward of the metal bellows.

8 Claims, 7 Drawing Sheets

(58) Field of Classification Search
USPC .......................................................... 277/389
See application file for complete search history.

(56) References Cited

FOREIGN PATENT DOCUMENTS

| | | | |
|---|---|---|---|
| JP | 2539905 | B1 | 10/1996 |
| JP | 20025288 | A | 1/2002 |
| JP | 2004108511 | A | 4/2004 |
| JP | 2005048902 | A | 2/2005 |
| JP | 2005140285 | A | 6/2005 |

* cited by examiner

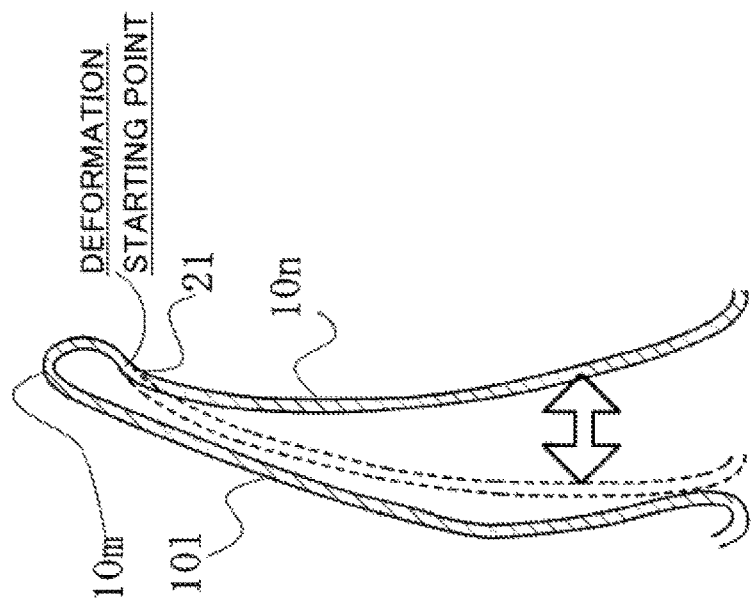
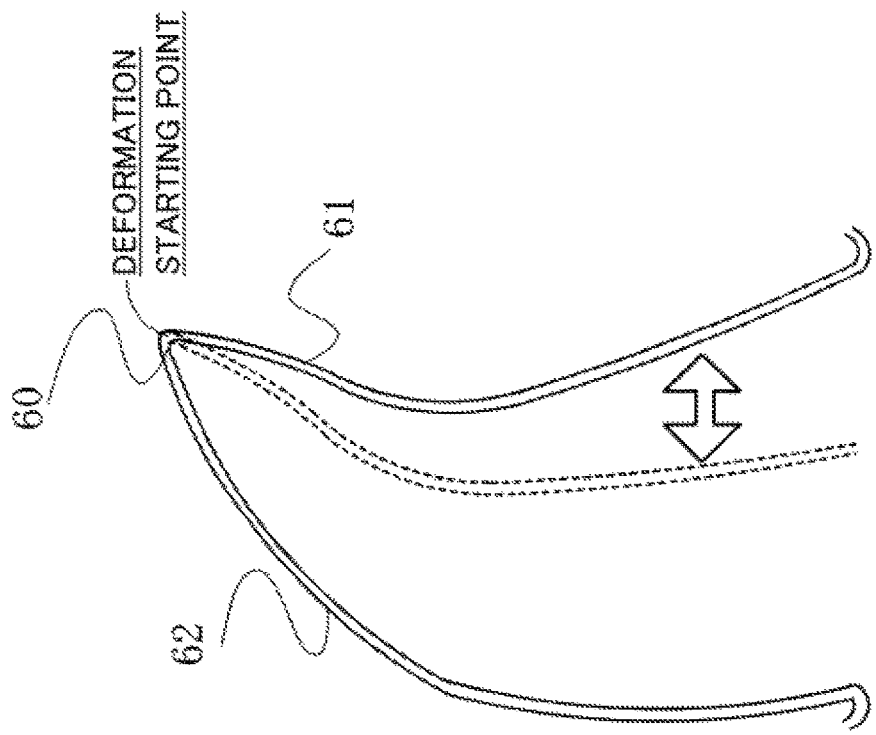

METAL BELLOWS

This application is the U.S. National Phase under 35 U.S.C. § 371 of International Application PCT/JP2015/080326, filed Oct. 28, 2015, which claims priority to Japanese Patent Application No. 2014-224804, filed Nov. 5, 2014. The International Application was published under PCT Article 21(2) in a language other than English.

TECHNICAL FIELD

The present invention relates to a metal bellows. More particularly, a metal bellows of the present invention relates to a formed bellows suitably used as a component of an accumulator for automotive use or the like.

BACKGROUND ART

As for conventional metal bellows, for example, formed metal bellows, U shaped bellows with U shaped peaks and valleys are known (hereinafter, referred to as "Conventional Art 1". See Patent Documents 1 and 2, for example).

As for formed metal bellows, a bellows in which an average wave-top direction and an average wave-bottom direction are each inclined in opposite directions relative to the axis in order to increase the amplitude of the axial elasticity of the bellows is proposed (hereinafter, referred to as "Conventional Art 2". See Patent Document 3, for example).

Further, as for metal bellows, an accumulator that includes a metal bellows formed in a cylindrical shape and capable of axial extension and contraction, a movable plate fixed to one end of the bellows, and an annular sealing member fixed to the undersurface of the movable plate, in which the annular sealing member can be seated on and separated from an upper base wall of a stay, and when seated, seals a working fluid (also referred to as a backup fluid) in a space formed between the bellows and the stay to prevent excessive contraction deformation of the bellows, is known (hereinafter, referred to as "Conventional Art 3". See Patent Document 4, for example).

CITATION LIST

Patent Document

Patent Document 1: JP 2539905 B1
Patent Document 2: JP 2005-48902 A
Patent Document 3: JP 07-174233 A
Patent Document 4: JP 2004-108511 A

SUMMARY OF THE INVENTION

Problem to be Solved by the Invention

However, Conventional Art 1 described above has a problem that, as shown in FIG. 4A, when installed in an accumulator, and a U shaped peak 50 of the metal bellows is brought into contact with a shell 51 of the accumulator by vibration, the U shaped peak 50 is widened laterally from the top, and broken due to repeated stress fatigue. There is another problem that since the curvature radius R of the peak 50 and a valley 52 of the U shape is large, the axial close-contact length of the metal bellows is increased, and the axial dimension of the accumulator is increased. There is still another problem that when the curvature radius R of the U shaped peak 50 and valley 52 is large, stress on the peak 50 and the valley 52 during extension and contraction operations is increased, and their durability is reduced. There is an additional problem that when, conversely, the curvature radius R of the U shaped peak 50 and valley 52 is reduced, an oil canning phenomenon (for example, a defective phenomenon in which, when pressed lightly, a flat surface of a drawn product is dented to the opposite side, and when released, returns to its original shape. A phenomenon referred to as "Beko" in Japanese.) occurs, and their durability is shortened.

Conventional Art 2 allows the axial close-contact length of the metal bellows to be shortened to a certain extent, but has a problem that since peaks of the metal bellows have a U shape, when the metal bellows extends and contracts, bellies repeat axial deformation with the top of the peaks as a fulcrum, so that the top of the peaks is repeatedly subjected to stress, fatigued and broken, and reduced in durability. In particular, peaks of metal bellows are work-hardened during formation, and thus are susceptible to breakage when repeatedly subjected to stress.

In Conventional Art 3, there is a fear that when a foreign substance is caught in the annular sealing member fixed to the undersurface of the movable plate, and the backup fluid leaks, resulting in a state where a pressure difference occurs between the inside and the outside of the bellows (a state where the backup fluid has leaked out in a zero-down state), the bellows is abnormally deformed by gas pressure in the accumulator, and at worst, broken.

The present invention has a first object of providing a metal bellows with high durability by, when the tips of peaks of the metal bellows are brought into contact with an opposing external wall or the like by vibration, reducing an impact on contact, and reducing deformation of the tips of the peaks to a minimum even on contact, thereby reducing stress caused on the peak.

The present invention has a second object of providing a metal bellows with high durability by, even when a pressure difference occurs between the inside and the outside of the metal bellows, and abnormal deformation occurs in the metal bellows, reducing deformation of the tips of peaks to a minimum, thereby reducing stress caused on the peak.

Means for Solving Problem

To attain the above objects, a metal bellows according to a first aspect of the present invention is a metal bellows in an annular shape including a structure repeated axially in which a first valley, a first belly, a first peak, a second belly, a second valley, a third belly, a second peak, and a fourth belly are integrally formed in series in this order, in a free length state of the bellows in an early stage of incorporation without extension and contraction, the valleys each turning around in a U shape in cross section, the peaks each turning around in an arc shape in cross section, the peaks each being provided in a position offset with respect to a center of a pitch between the valleys adjacent to the peaks on both sides, of the bellies connected to the peaks on both sides, at least the bellies located on the offset side being provided with a constriction protruding inward of the metal bellows.

According to this aspect, an oil canning phenomenon at the peaks can be avoided. Further, an impact on the peaks when the peaks are brought into contact with an opposing shell of an accumulator or the like can be reduced, and deformation of the peaks themselves can be reduced. As a result, the durability of the peaks can be improved. Further, since the peaks hardly deform during normal extension and contraction of the metal bellows, and during abnormal contraction due to sealing loss, stress caused by repeated deformation does not act on the peaks, so that the durability of the peaks can be improved. Furthermore, the arc shape of the peaks can be formed according to setting. Moreover, even in a close-contact state during abnormal contraction due to sealing loss or the like, the bellies are slimmed down in proximity to each other by gas pressure, not contacting each other, so that a compression-weighting curve can have linearity and small hysteresis.

According to a second aspect of the present invention, in the metal bellows according to the first aspect, the constriction is provided continuously or discontinuously with the peaks in the arc shape in cross section.

According to a third aspect of the present invention, in the metal bellows according to the first or second aspect, the constriction has an arc shape in cross section, whose curvature radius $R2$ is set in a range of $R2=1R1$ to $5R1$, where $R1$ is an arc-shaped curvature radius of the peaks.

Effect of the Invention

The present invention achieves the following outstanding effects.

(1) An oil canning phenomenon at the peaks can be avoided. An impact on the peaks when the peaks are brought into contact with an opposing shell of an accumulator or the like can be reduced, and deformation of the peaks themselves can be reduced. As a result, the durability of the peaks can be improved.

(2) Since the peaks hardly deform during normal extension and contraction of the metal bellows, and during abnormal contraction due to the leakage of the backup fluid in a zero-down state, stress caused by repeated deformation does not act on the peaks, so that the durability of the peaks can be improved.

(3) The arc shape of the peaks can be formed according to setting.

(4) In a close-contact state during abnormal contraction due to the leakage of the backup fluid in a zero-down state or the like, the bellies are slimmed down in proximity to each other by gas pressure, not contacting each other, so that a compression-weighting curve can have linearity and small hysteresis.

BRIEF DESCRIPTION OF THE DRAWINGS

FIG. 4A is a diagram illustrating a situation where a peak of the metal bellows of Conventional Art 1 strikes an opposing wall of a shell or the like;

FIG. 4B is a diagram illustrating a situation where a peak of the metal bellows of the present invention strikes an opposing wall of a shell or the like;

FIG. 5A is a diagram illustrating the state of the metal bellows of Conventional Art 2 when extended and contracted;

FIG. 5B is a diagram illustrating the state of the metal bellows of the present invention when extended and contracted;

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
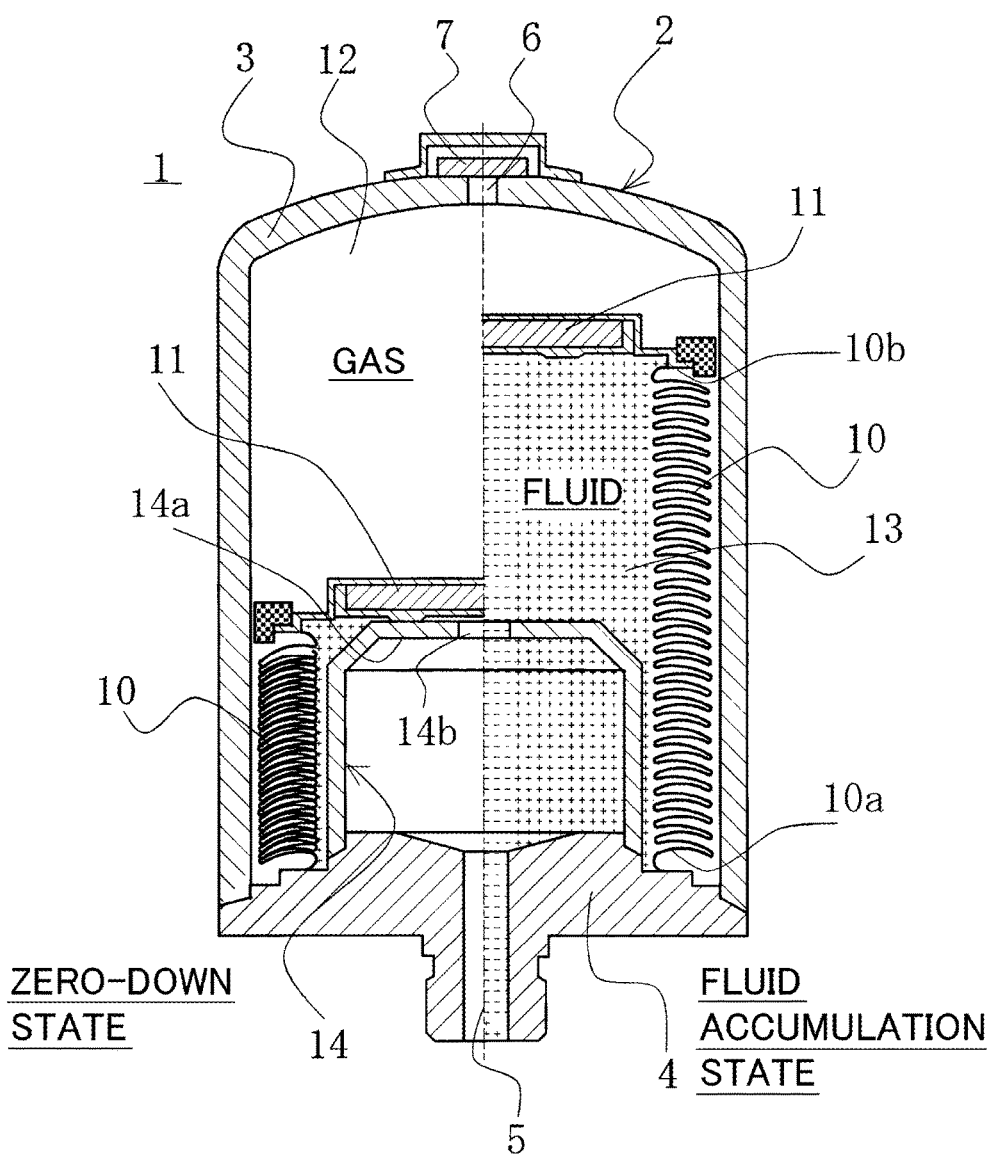
FIG. 1 is a vertical cross-sectional view of an accumulator including a metal bellows according to a first embodiment of the present invention.

FIG. 1 shows a cross section of an accumulator 1 including a metal bellows 10 according to a first embodiment of the present invention. The left side of the figure shows a state where the metal bellows 10 is contracted, and the right side of the figure shows a state where the metal bellows 10 is extended.

The accumulator 1 shown in FIG. 1 is a metal bellows type accumulator using the metal bellows 10 formed as a bellows, and is configured as below.

First, an accumulator housing 2 having an oil port 4 to be connected to pressure piping not shown is provided. The metal bellows 10 and a bellows cap 11 are disposed in the housing 2, partitioning the interior space of the housing 2 into a gas chamber 12 in which high-pressure gas (e.g. nitrogen gas) is sealed, and a fluid chamber 13 communicating with a port hole 5 of the oil port 4. The housing 2 is formed by a combination of a bottomed cylindrical shell 3 and the oil port 4 fixed (welded) to an opening of the shell 3. The shell 3 is provided in the bottom with a gas inlet 6 for injecting gas into the gas chamber 12, which is closed with a gas plug 7 after gas injection.

The metal bellows 10 has a fixed end 10a fixed (welded) to an inner surface of the oil port 4, a port-side inner surface of the housing 2, and a freely moving end 10b to which the bellows cap 11 in a disk shape is fixed (welded). The accumulator 1 is an external gas type accumulator in which the gas chamber 12 is disposed on the outer peripheral side of the metal bellows 10, and the fluid chamber 13 is disposed on the inner peripheral side of the metal bellows 10.

An annular or tubular stay 14 is fixed (welded) in a position on the port-side inner surface of the housing 2, that is, the inner surface of the oil port 4. The bellows cap 11 separably abuts the distal end (upper end in the figure) of the stay 14. An inward flange 14a is provided at an inner peripheral surface of the stay 14. The inner periphery of the flange 14a is a communication hole 14b.

Next, the metal bellows 10 according to the first embodiment of the present invention will be described.

Figure 2:
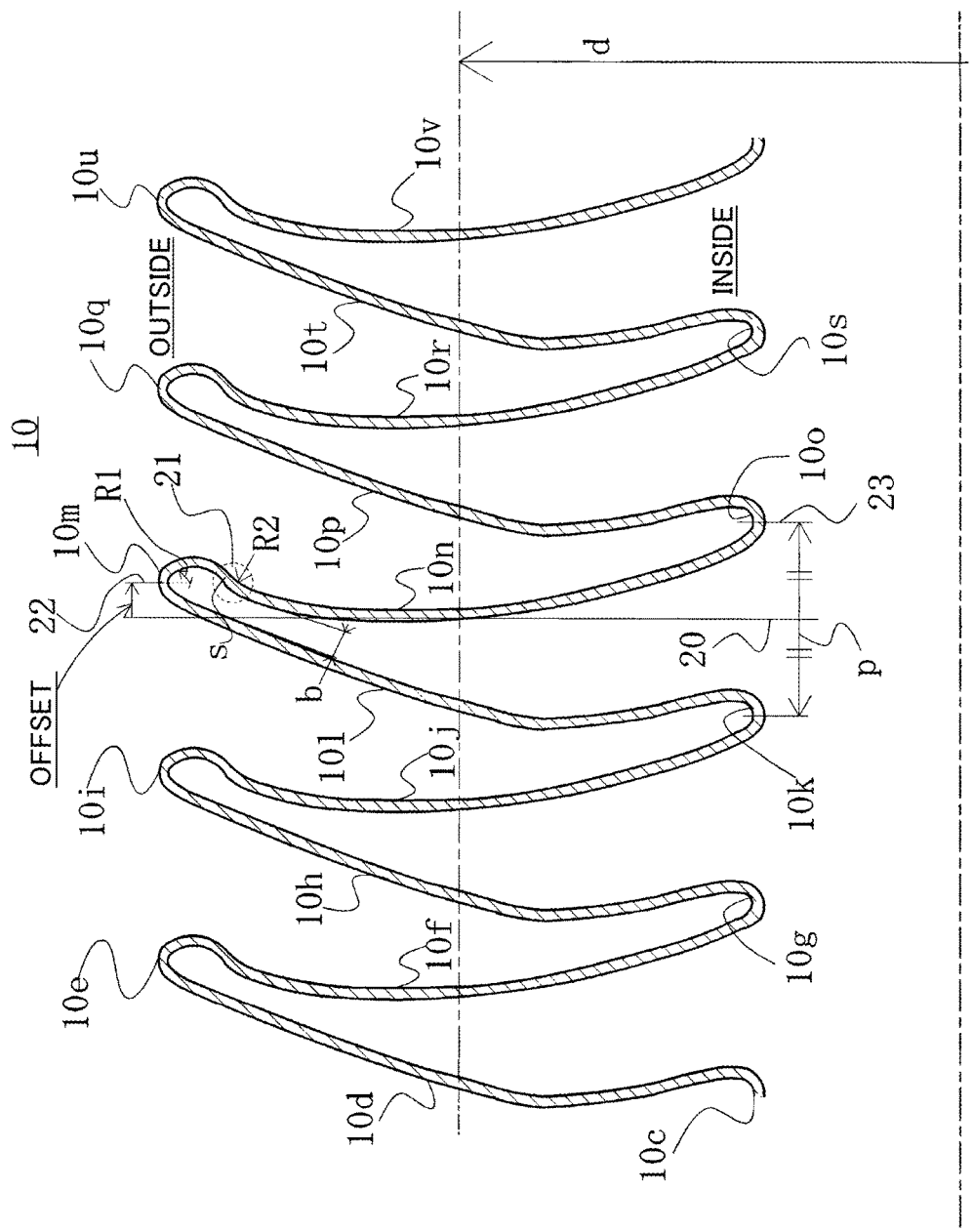
FIG. 2 is an axially half cross-sectional view of a principal part showing a free length state of the metal bellows in an early stage of incorporation without extension and contraction according to the first embodiment of the present invention.

FIG. 2 shows a free length state of the metal bellows 10 in an early stage of incorporation without extension and contraction. In FIG. 2, the metal bellows 10 is in an annular shape, and has a structure repeated axially in which a first valley 10c, a first belly 10d, a first peak 10e, a second belly 10f, a second valley 10g, a third belly 10h, a second peak 10i, a fourth belly 10j, . . . , a tenth belly 10v are integrally formed in series in this order.

In the metal bellows 10 in the free length state in the early stage of incorporation without extension and contraction, the valleys 10c, 10g, 10k, 10o, and 10s each turn around in a U shape in cross section, and the peaks 10e, 10i, 10m, 10q, and 10u each turn around in an arc shape in cross section.

The curvature radius R1 of the peaks, for example, is preferably set in a range of 0.1 mm to 1.0 mm when the outside diameter of the metal bellows 10 is 70 mm.

Further, the bellies 10d, 10f, 10h, 10j, 10l, 10n, 10p, 10r, 10t, and 10v each have an arc shape protruding in one axial direction, leftward in FIG. 2, and the peaks 10e, 10i, 10m, 10q, and 10u are each formed to be located in a position offset in a direction opposite to the protruding side of the arc shape (rightward in FIG. 2. Hereinafter sometimes referred to as an "offset side") with respect to the center of a pitch between the valleys adjacent to the peaks on both sides, for example, for the peak 10m (Hereinafter the peak 10m is sometimes used as an example for description.), with respect to the center 20 of the pitch between the adjacent valleys 10k and 10o on both sides.

In the present invention, the corrugated shape of a metal bellows in which a peak is formed to be located in a position offset with respect to the center of a pitch between adjacent valleys on both sides is referred to as an "arch shape".

Of the bellies connected to the peaks on both sides, for example, for the peak 10m, of the bellies 10l and 10n connected to this on both sides, at least the belly 10n located on the offset side is provided with a constriction 21 protruding inward of the metal bellows 10.

As shown in FIG. 2, the constriction 21 may be provided continuously with the peak 10m, or may be provided discontinuously, slightly spaced from the peak 10m toward the inside diameter.

The constriction 21 has an arc shape in cross section, and its curvature radius R2 is preferably set in a range of R2=1R1 to 5R1, where R1 is the arc-shaped curvature radius of the peak 10m. More preferably, it is set in a range of R2=1R1 to 1.5R1. The constriction 21 is preferably connected smoothly to the arc-shaped peak 10m or the arc-shaped belly 10n on both sides thereof. In the case of FIG. 2, the constriction 21 is smoothly connected to the peak 10m so that tangents to the arcs at a connection s are the same tangent. Therefore, the peak 10m has a cross-sectional shape nearer to a circle than a semicircle.

Next, the shapes of the bellies shown in FIG. 2 will be described.

The bellies 10f, 10j, 10n, 10r, and 10v on the offset side each have a smooth arc shape with an almost constant curvature.

On the other hand, the bellies 10d, 10h, 10l, 10p, and 10t opposite to the offset side each have a portion on the inside diameter side from an effective diameter d of the metal bellows 10, bent sharply with a relatively small curvature radius, and a portion on the outside diameter side bent with a curvature radius larger than that on the inside diameter side.

At the peak 10m, for example, the axial width b at connections of the bellies 10l and 10n to the peak 10m is smaller than, ⅓ to ¼ of, a pitch p between the adjacent valleys 10k and 10o on both sides. That is, when viewed from the inside of the metal bellows 10, the bellies 10l and 10n are narrowed from the valley side to the peak 10m, and thus the interior of the metal bellows 10 has a shape narrowed from the inside diameter side to the outside diameter side.

On the other hand, a pitch between adjacent peaks is equal to the pitch p of the valleys, and thus the exterior of the metal bellows 10 has a shape spreading out from the inside diameter side to the outside diameter side.

Thus, the amount of extension and contraction can be increased while deformation of the peaks and the valleys remains small.

Figure 3:
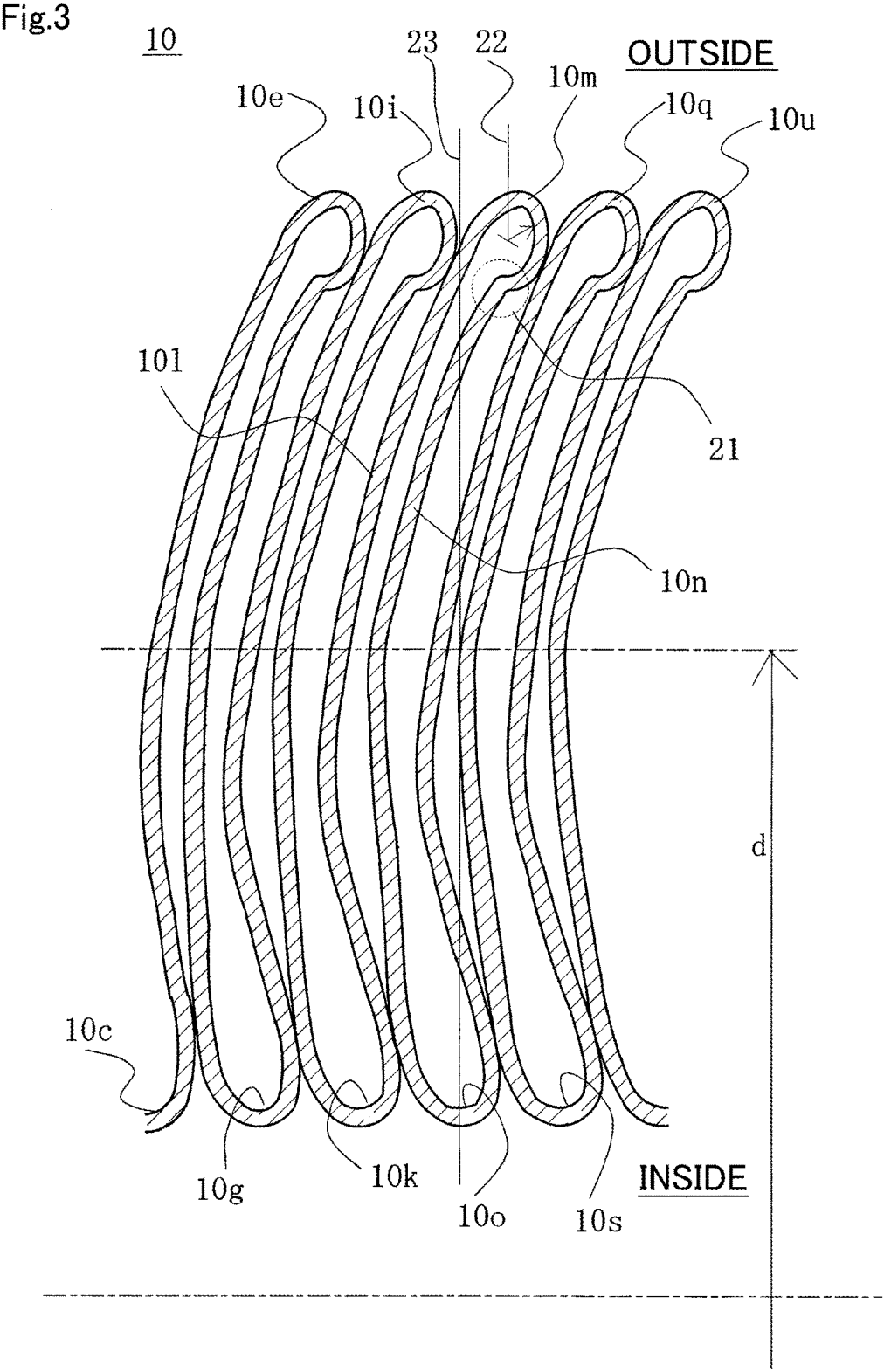
FIG. 3 is an axially half cross-sectional view of the principal part showing a close-contact length state of the metal bellows according to the first embodiment of the present invention.

The metal bellows 10 contracts when subjected to an axial external force, and can contract at a maximum to a close-contact length state shown in FIG. 3.

As is clear from FIG. 3, when the metal bellows 10 contracts from the free length state in FIG. 2 to the close-contact length state in FIG. 3, the adjacent valleys axially come close to each other while the adjacent peaks come close to each other. When the adjacent peaks contact each other, the metal bellows 10 is in the close-contact length state. In the close-contact state, the bellies do not contact each other, so that a compression-weighting curve can have linearity and small hysteresis.

In the free length state in FIG. 2, with respect to the axial center 22 of the peak 10m, the axial center 23 of the adjacent valley 10o is located on the right side.

On the other hand, in the close-contact length state in FIG. 3, with respect to the axial center 22 of the peak 10m, the axial center 23 of the adjacent valley 10o is located on the left side.

This is because the belly 10n axially deforms with the constriction 21 as a starting point.

Next, the effects of the metal bellows 10 according to the first embodiment of the present invention will be described.

As described above, in a case where a metal bellows with U shaped peaks and valleys is installed in an accumulator, when the U shaped peaks of the metal bellows strike a shell of the accumulator due to vibration, the U shaped peaks are laterally widened from the top, and broken due to repeated stress fatigue.

Also, the metal bellows has such characteristics that when the curvature radius of the peaks and the valleys is large, stress on the peaks and valleys during extension and contraction operations is increased, reducing the durability, and conversely, when the curvature radius of the peaks and the valleys is small, an oil canning phenomenon occurs, shortening the durability.

Therefore, it is important to reduce an impact on contact of the peaks, and reduce deformation of the tips of the peaks to a minimum on contact to reduce stress caused on the peaks. Further, it is important to set the curvature radius of the peaks or the valleys to an appropriate value, and to enable formation according to the setting.

In particular, when the arc shape of the peaks is smaller than the arc shape of the valleys (when the curvature radius is 1 mm or less) as in the metal bellows according to the first embodiment of the present invention, it is an important point that the arc shape of the peaks can be formed according to setting.

The inventors of the present invention have made findings that in the formation of the metal bellows 10, by providing the constriction 21, the arc shape of the peaks can be formed according to the setting. Consequently, in the metal bellows 10 according to the embodiment of the present invention, the arc shape of the peaks can be formed according to the setting.

Figures 4A, 4B:
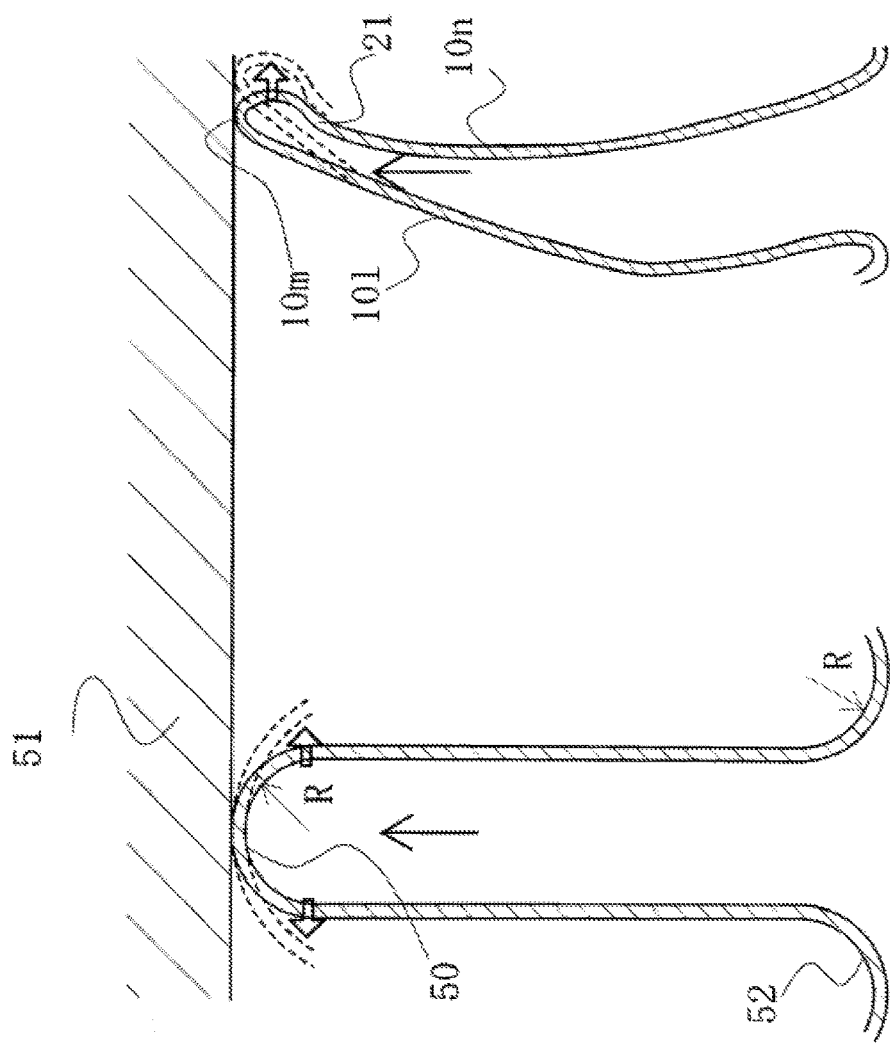

FIGS. 4A and 4B are diagrams illustrating a situation where a peak of a metal bellows strikes an opposing wall of a shell or the like. As shown in FIG. 4B, the metal bellows of the present invention can avoid an oil canning phenomenon because the corrugated shape is an arch shape in which the bellies 10*l* and 10*n* have an arc shape protruding in one axial direction, and the peak 10*m* is offset with respect to the center of the pitch between the adjacent valleys on both sides. When the peak 10*m* strikes against the shell 51 in a direction shown by an arrow due to vibration of the accumulator, the peak 10*m* can axially escape owing to the deformation of the bellies 10*l* and 10*n*. This allows the reduction of an impact on the peak 10*m*. Since the constriction 21 is provided, the peak 10*m* has a cross-sectional shape nearer to a circle than a semicircle, so that the deformation of the peak 10*m* itself can be reduced.

FIGS. 5A and 5B are diagrams illustrating the state of a metal bellows when extended and contracted. FIG. 5A shows that in Conventional Art 2, and FIG. 5B shows the metal bellows of the present invention.

In Conventional Art 2, as shown in FIG. 5A, during extension and contraction of the metal bellows, when attention is paid to a peak 60, a belly 61 repeats deformation with the top of the peak 60 as a fulcrum, so that the top of the peak 60 is repeatedly subjected to stress, fatigued and broken, and reduced in durability. In particular, the peak 60 of the metal bellows is work-hardened during formation, and thus is susceptible to breakage when repeatedly subjected to stress.

On the other hand, in the metal bellows of the present invention, as shown in FIG. 5B, during extension and contraction of the metal bellows, when attention is paid to the peak 10*m*, for example, the belly 10*n* on the side on which the constriction 21 is provided repeats deformation with the constriction 21 as a fulcrum, and the peak 10*m* hardly deforms. Therefore, stress caused by repeated deformation does not act on the peak 10*m*.

Since the constriction 21 is work-hardened during formation to a lesser extent than the peak 10*m*, the durability is improved compared to Conventional Art 2.

In the above-described first embodiment, the metal bellows 10, in which, in a free length state in an early stage of incorporation without extension and contraction, valleys each turn around in a U shape in cross section, peaks each turn around in an arc shape in cross section, bellies each have an arc shape protruding in one axial direction and the peaks are each provided in a position offset with respect to the center of a pitch between valleys adjacent to the peaks on both sides, and of the bellies connected to the peaks on both sides, at least the bellies located on the offset side are provided with a constriction protruding inward of the metal bellows, thus achieves the following effects.

(1) An oil canning phenomenon at the peaks can be avoided. An impact on the peaks when the peaks are brought into contact with an opposing shell of an accumulator or the like can be reduced, and deformation of the peaks themselves can be reduced. As a result, the durability of the peaks can be improved.

(2) Since the peaks hardly deform during normal extension and contraction of the metal bellows, and during abnormal contraction due to the leakage of the backup fluid in a zero-down state, stress caused by repeated deformation does not act on the peaks, so that the durability of the peaks can be improved.

(3) The arc shape of the peaks can be formed according to setting.

(4) In a close-contact state during abnormal contraction due to the leakage of the backup fluid in a zero-down state or the like, the bellies are slimmed down in proximity to each other by gas pressure, not contacting each other, so that a compression-weighting curve can have linearity and small hysteresis.

Second Embodiment

Figure 6:
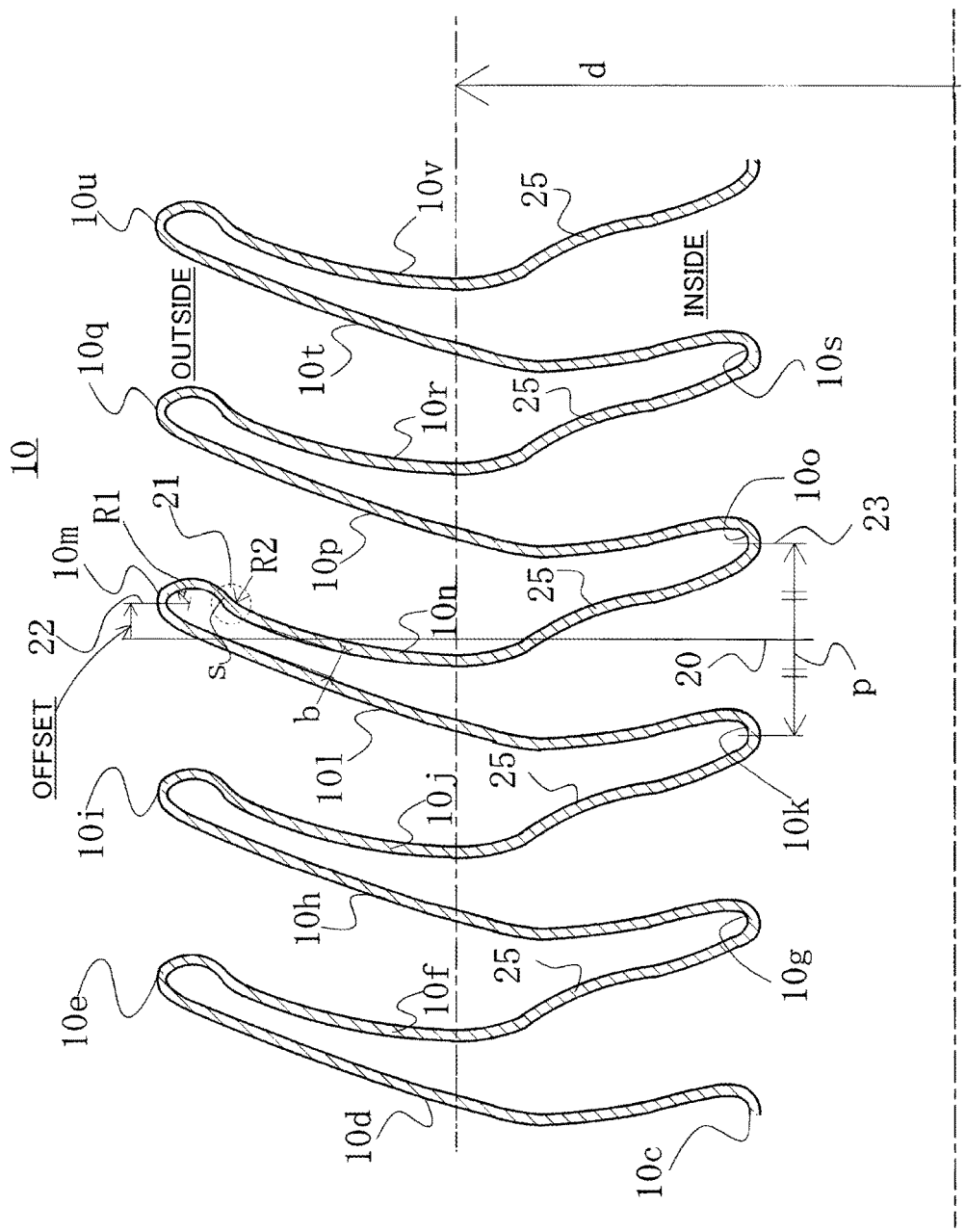
FIG. 6 is an axially half cross-sectional view of a principal part showing a free length state of a metal bellows in an early stage of incorporation without extension and contraction according to a second embodiment of the present invention.

FIG. 6 is an axially half cross-sectional view of a principal part illustrating a free length state of a metal bellows in an early stage of incorporation without extension and contraction according to a second embodiment of the present invention. A metal bellows 10 according to the second embodiment is different from the metal bellows in the first embodiment in that the shape of bellies on the offset side is slightly different, but otherwise the same as the first embodiment, and redundant descriptions are omitted.

In FIG. 6, bellies 10*d*, 10*f*, 10*h*, 10*j*, 10*l*, 10*n*, 10*p*, 10*r*, 10*t*, and 10*v* each have a shape protruding in one axial direction, leftward (toward the side opposite to the offset side) as a whole with respect to the pitch center 20 in FIG. 6, and peaks 10*e*, 10*i*, 10*m*, 10*q*, and 10*u* are each formed to be located in a position offset in a direction opposite to the protruding side, that is, to the offset side, with respect to the center of a pitch between the valleys adjacent to the peaks on both sides, for example, for the peak 10*m*, with respect to the center 20 of the pitch between the adjacent valleys 10*k* and 10*o* on both sides.

Compared to those in the first embodiment, the bellies 10*f*, 10*j*, 10*n*, 10*r*, and 10*v* on the offset side each have a portion on the inside diameter side from an effective diameter d of the metal bellows 10, having a bulge 25 that bulges toward the offset side, and a portion on the outside diameter side bent with a large protrusion toward the side opposite to the offset side with respect to the pitch center 20, and are formed in a shape protruding toward the side opposite to the offset side with respect to the pitch center 20 in their entirety of the bellies on the offset side.

On the other hand, as in the first embodiment, the bellies 10*d*, 10*h*, 10*l*, 10*p*, and 10*t* opposite to the offset side each have a portion on the inside diameter side from the effective diameter d of the metal bellows 10, bent sharply with a relatively small curvature radius, and a portion on the outside diameter side bent with a curvature radius larger than that on the inside diameter side.

Figure 7:
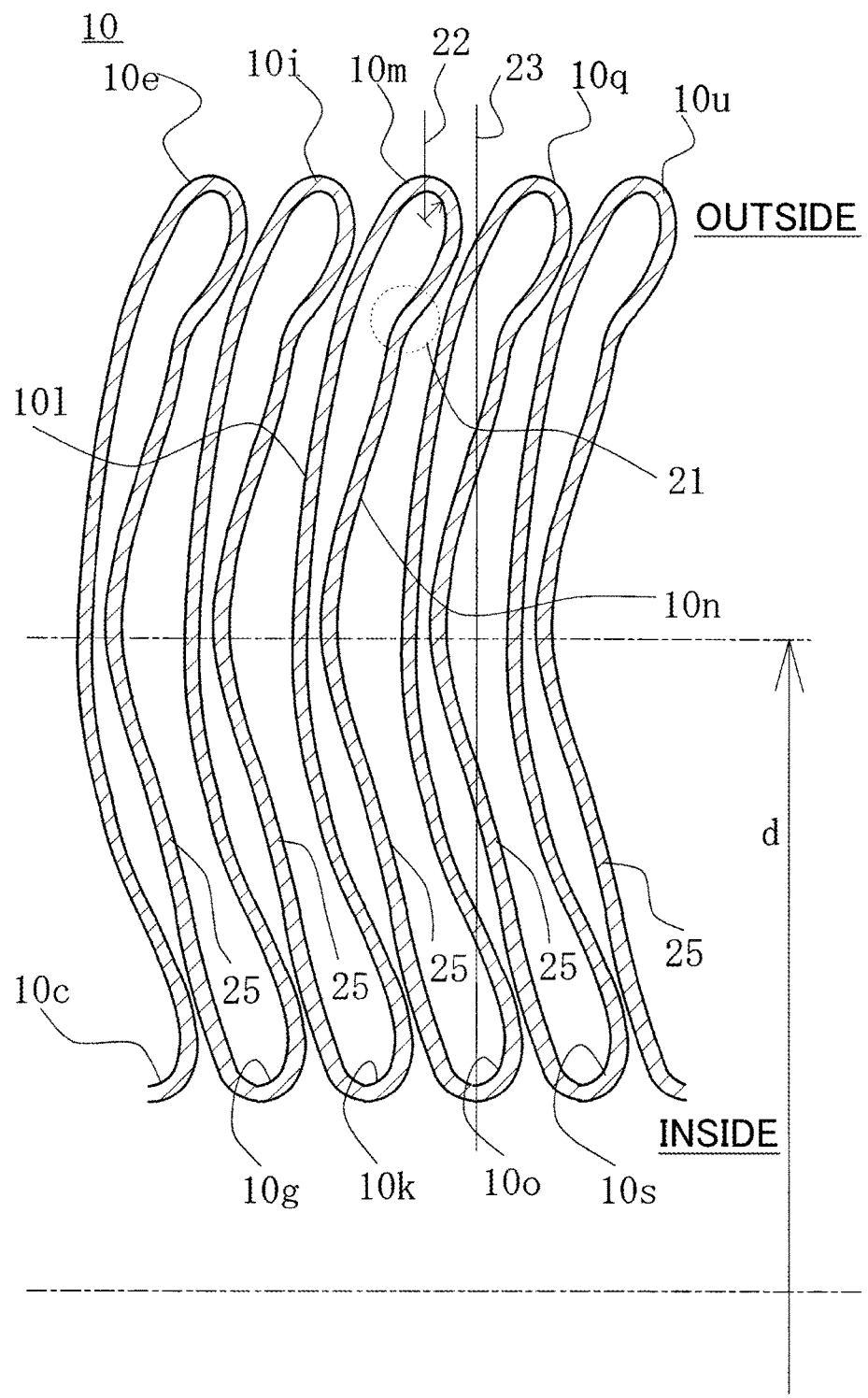
FIG. 7 is an axially half cross-sectional view of the principal part showing a close-contact length state of the metal bellows according to the second embodiment of the present invention.

In the second embodiment, the metal bellows 10 also contracts when subjected to an axial external force, and can contract at a maximum to a close-contact length state shown in FIG. 7.

As is clear from FIG. 7, when the metal bellows 10 contracts from the free length state in FIG. 6 to the close-contact length state in FIG. 7, the adjacent valleys axially come close to each other while the adjacent peaks come close to each other. When the adjacent peaks contact each other, the metal bellows 10 is in the close-contact length state. In the close-contact state, the bellies do not contact each other, so that a compression-weighting curve can have linearity and small hysteresis.

In the free length state in FIG. 6, with respect to the axial center 22 of the peak 10*m*, the axial center 23 of the adjacent valley 10*o* is located on the right side.

On the other hand, in the close-contact length state in FIG. 7, with respect to the axial center 22 of the peak 10*m*, the axial center 23 of the adjacent valley 10*o* is moved to a position in proximity to the axial center 22 of the peak 10*m*.

This is because the belly 10*n* axially deforms with a constriction 21 as a starting point.

In the above-described second embodiment, the metal bellows 10, in which, in a free length state in an early stage of incorporation without extension and contraction, valleys each turn around in a U shape in cross section, peaks each turn around in an arc shape in cross section, bellies each have a shape protruding in one axial direction and the peaks are each provided in a position offset with respect to the center of a pitch between valleys adjacent to the peaks on both sides, and of the bellies connected to the peaks on both sides, at least the bellies located on the offset side are provided with a constriction protruding inward of the metal bellows, thus achieves the following effects as in the first embodiment.

(1) An oil canning phenomenon at the peaks can be avoided. An impact on the peaks when the peaks are brought into contact with an opposing shell of an accumulator or the like can be reduced, and deformation of the peaks themselves can be reduced. As a result, the durability of the peaks can be improved.

(2) Since the peaks hardly deform during normal extension and contraction of the metal bellows, and during abnormal contraction due to the leakage of the backup fluid in a zero-down state, stress caused by repeated deformation does not act on the peaks, so that the durability of the peaks can be improved.

(3) The arc shape of the peaks can be formed according to setting.

(4) In a close-contact state during abnormal contraction due to the leakage of the backup fluid in a zero-down state or the like, the bellies are slimmed down in proximity to each other by gas pressure, not contacting each other, so that a compression-weighting curve can have linearity and small hysteresis.

Although the embodiments of the present invention have been described above with reference to the drawings, the detailed configuration is not limited to these embodiments, and any changes and additions without departing from the scope of the present invention are included in the present invention.

For example, the embodiments have been described in the case where the metal bellows 10 according to the present invention is installed in an accumulator, which is not limiting. The metal bellows 10 can be used in a pipeline.

Further, for example, the embodiments have been described in the case where the constriction 21 is provided in the bellies on the offset side, which is not limiting. The constriction 21 may be provided in the bellies on both sides.

Further, for example, the embodiments have been described in the case where the peaks and the constriction are each in an arc shape with a constant curvature radius, but do not necessarily need to be in an arc shape with a completely constant curvature radius. For example, they may be an arc in which the curvature varies in the middle, such as an elliptic arc.

REFERENCE SIGN LIST

1 accumulator
2 housing
3 shell
4 oil port
5 port hole
6 gas inlet
7 gas plug
10 metal bellows
10a fixed end
10b freely moving end
10c, 10g, 10k, 10o, 10s valley
10d, 10f, 10h, 10j, 10l, 10n, 10p, 10r, 10t, 10v belly
10e, 10i, 10m, 10q, 10u peak
11 bellows cap
12 gas chamber
13 fluid chamber
14 stay
20 center of a pitch between valleys
21 constriction
22 center of a peak in a free length state
25 bulge
$\theta$ offset angle
d effective diameter

The invention claimed is:

1. A metal bellows in an annular shape comprising a structure repeated axially in which a first valley, a first belly, a first peak, and a second belly, which constitute a first pleat, and a second valley, a third belly, a second peak, and a fourth belly, which constitute a second pleat, are integrally formed in series in this order, in a free length state of the bellows in an early stage of incorporation without extension and contraction, the first and second valleys each turning around in a U shape in cross section, constituting U-shaped valleys, the first and second peaks each turning around in an arc shape in cross section, constituting arc-shaped peaks, each of the arc-shaped peaks being provided in a position offset in an axial direction of the metal bellows with respect to a center of a pitch which is a distance in the axial direction between the U-shaped valleys adjacent to each arc-shaped peak, wherein each belly has a smooth arc shape in cross section and connects the U-shaped valley and the arc-shaped peak adjacent to the belly without undulation, wherein a boundary between the belly and the arc-shaped peak on the offset side of each pleat is formed by a constriction bent further inward of the pleat of the metal bellows than an offset-side part of the arc-shaped peak in the axial direction.

2. The metal bellows according to claim 1, wherein the constriction is provided continuously or discontinuously with the peaks in the arc shape in cross section.

3. The metal bellows according to claim 1, wherein the constriction has an arc shape in cross section, whose curvature radius R2 is set in a range of R2=1R1 to 5R1, where R1 is an arc-shaped curvature radius of the peaks.

4. The metal bellows according to claim 2, wherein the constriction has an arc shape in cross section, whose curvature radius R2 is set in a range of R2=1R1 to 5R1, where R1 is an arc-shaped curvature radius of the peaks.

5. The metal bellows according to claim 1, wherein the bellies opposite to the offset side each are constituted by an inside-diameter-side portion, with reference to an effective diameter of the metal bellows, having a bend with a small curvature radius, and an outside-diameter-side portion, with reference to the effective diameter of the metal bellows, having a bend with a curvature radius larger than the curvature radius of the inside-diameter-side portion.

6. The metal bellows according to claim 2, wherein the bellies opposite to the offset side each are constituted by an inside-diameter-side portion, with reference to an effective diameter of the metal bellows, having a bend with a small curvature radius, and an outside-diameter-side portion, with reference to the effective diameter of the metal bellows, having a bend with a curvature radius larger than the curvature radius of the inside-diameter-side portion.

7. The metal bellows according to claim 3, wherein the bellies opposite to the offset side each are constituted by an inside-diameter-side portion, with reference to an effective diameter of the metal bellows, having a bend with a small curvature radius, and an outside-diameter-side portion, with reference to the effective diameter of the metal bellows, having a bend with a curvature radius larger than the curvature radius of the inside-diameter-side portion.

8. The metal bellows according to claim 4, wherein the bellies opposite to the offset side each are constituted by an inside-diameter-side portion, with reference to an effective diameter of the metal bellows, having a bend with a small curvature radius, and an outside-diameter-side portion, with reference to the effective diameter of the metal bellows, having a bend with a curvature radius larger than the curvature radius of the inside-diameter-side portion.

* * * * *